United States Patent [19]

Knox et al.

[11] Patent Number: 5,448,572
[45] Date of Patent: Sep. 5, 1995

[54] SPARE SIGNAL LINE SWITCHING METHOD AND APPARATUS

[75] Inventors: Lonnie A. Knox, Reston; Dale A. Rickard, Manassas, both of Va.

[73] Assignee: International Business Machines Corporation, Armonk, N.Y.

[21] Appl. No.: 212,372

[22] Filed: Mar. 14, 1994

Related U.S. Application Data

[63] Continuation of Ser. No. 745,646, Aug. 16, 1991, abandoned.

[51] Int. Cl.$^6$ .......................... G06F 11/00; H04J 1/16; H04J 3/14; H04B 3/38
[52] U.S. Cl. ...................................... 370/16; 340/827; 395/182.02
[58] Field of Search .................. 371/8.1, 8.2, 11.2; 370/16; 340/827

[56] References Cited

U.S. PATENT DOCUMENTS

| | | | |
|---|---|---|---|
| 3,805,039 | 4/1974 | Stiffler | 371/8.1 |
| 4,395,772 | 7/1983 | Trested, Jr. | 375/40 |
| 4,455,645 | 6/1984 | Mijioka et al. | 370/16 |
| 4,566,102 | 1/1986 | Hefner | 371/11.1 |
| 4,625,306 | 11/1986 | Newman | 370/60 |
| 4,646,286 | 2/1987 | Reid et al. | 370/16 |
| 4,722,084 | 1/1988 | Mator | 371/9.1 |
| 5,210,740 | 5/1993 | Anzai et al. | 370/16 |
| 5,229,990 | 7/1993 | Teraslinna | 370/60 |
| 5,331,631 | 7/1994 | Teraslinna | 370/60 |

*Primary Examiner*—Robert W. Beausoliel, Jr.
*Assistant Examiner*—Phillip F. Vales
*Attorney, Agent, or Firm*—Joseph C. Redmond; M. A. Wurm

[57] ABSTRACT

An apparatus and method for increasing the mean time between failure for computer systems is disclosed. A single spare line can be used to replace any of several signal lines. Using 2:1 multiplexers, defective signal lines can easily be switched to a nonoperative state and the remaining signal lines shifted to provide for replacement of the defective line without significant path length increase or signal time delay. The invention is applicable to signal paths of different varieties, including electrical, electro-optical and fluidic.

7 Claims, 4 Drawing Sheets

KEY: MULTIPLEXER

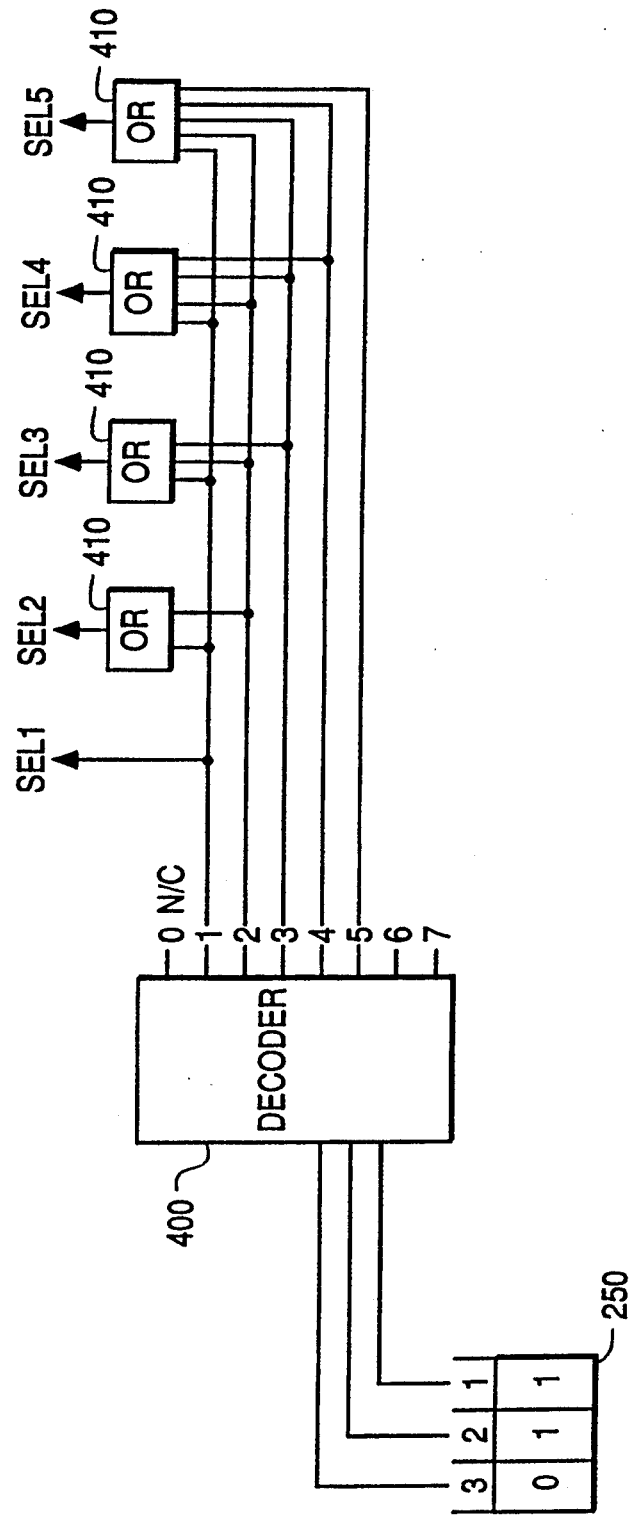

SPARE SIGNAL LINE SWITCHING METHOD AND APPARATUS

This application is a continuation of U.S. Ser. No. 07/745,646, filed Aug. 16, 1991, L. A. Knox et. al., entitled "Spare Signal Line Switching Method and Apparatus", assigned to the same assignee as this application, now abandoned.

BACKGROUND OF THE INVENTION

1. Field of the Invention

This invention relates to a method and apparatus for increasing the mean time between failure for computer systems. In particular, a technique for allowing one signal line to be used as a spare for many signal lines is disclosed.

2. Background Information

Spare signal lines are often used to improve the availability of systems (computers, signal processors, etc.) in both military and commercial applications. Some military avionic designs use complete replication of critical signal lines. This approach, however, while minimizing fault isolation requirements, causes severe connector pin and backplane wiring problems as the number of signal lines are increased to provide adequate bandwidth for new high performance processors. For example, a 16 bit bus having 29 signal lines requires a total of 58 lines when a full complement of spares is used. A 32 bit bus requires at least 58 signal lines for a total of 116 lines when using this same approach. Unfortunately, in most applications there is not the space available to provide the luxury of full replication of signal lines.

An alternate approach provides one spare line for a relatively large selected set of signal lines. For example, one spare line can be provided for 39 lines between a memory and a processor. If one of the 39 signal lines fails, the bit normally assigned to the failed line is switched to the spare line, permitting normal operation to resume. The primary difficulty when using one spare line to effectively replace any one of several failed lines is the performance penalty for re-routing the signal from the failed line. FIG. 1 illustrates the prior art single spare line switching technique applied to 16 signal lines (Lines 1–16). A failed signal line is bypassed by selecting the respective input signal (Sig A–Sig P) and passing it over the spare signal line 20.

Four of the sixteen signal lines are fed into each of four multiplexers 22, 24, 26, 28. Select signal S0 and S1, from a register (not shown) connected to error detection logic, control which, if any, one of the four signals is outputted for each of the four multiplexers 22, 24, 26, 28 when a line failure is detected. The outputs from each of these multiplexers is inputted to another 4:1 multiplexer 30. Select signals S2 and S3 from the register determine which one of the four inputs is fed through to the spare line 20.

At the output of each of the lines 1–16 is a 2:1 multiplexer 32 (only 2 of the 16 are shown). Select signals Sel 0–Sel 15 provided by a 4:16 decoder (not shown) switch the appropriate multiplexer to permit the signal on the spare line 20 to be outputted in place of the failed signal line.

As the ratio of signal lines to spare lines increases, the number of levels of multiplexers required to route data intended for the failed line to the spare line increases. The additional delay imposed by multiple levels of multiplexers becomes a part of the critical path and must be accommodated in the machine cycle time. With 4:1 multiplexers., three levels are required to provide spares for a 58 line bus. In typical VLSI implementations, the multiplexer tree creates wire blockages and long wire lengths that add to the propagation delay. Furthermore, the spare line must be distributed across all the signal lines on the receive side, creating a long line with extra delays.

It is therefore desirable to provide a cost effective technique for replacing the failed line with reduced impact to the interface critical paths and less wiring congestion than prior approaches.

OBJECTS OF THE INVENTION

It is the primary object of this invention to provide a method and apparatus for replacing a failed signal line with reduced impact to signal path lengths and wiring congestion.

It is an additional object of this invention to provide a circuit for providing redundant signal lines for improving the mean time between failures for a computer system.

SUMMARY OF THE INVENTION

These objects, and other advantages to be described, are achieved by the inclusion of a single spare line which can be used to replace any of several signal lines. Using a combination of 2:1 multiplexers controlled by error detection logic, defective signal lines can easily be switched to a nonoperative state and the remaining signal lines shifted by one bit position to provide for replacement of the defective line, without a significant increase in path length.

BRIEF DESCRIPTION OF THE DRAWINGS

FIG. 3 is a block diagram of the fault register.

FIG. 4 is a block diagram of select generation logic.

DESCRIPTION OF THE PREFERRED EMBODIMENT

Figure 1A:
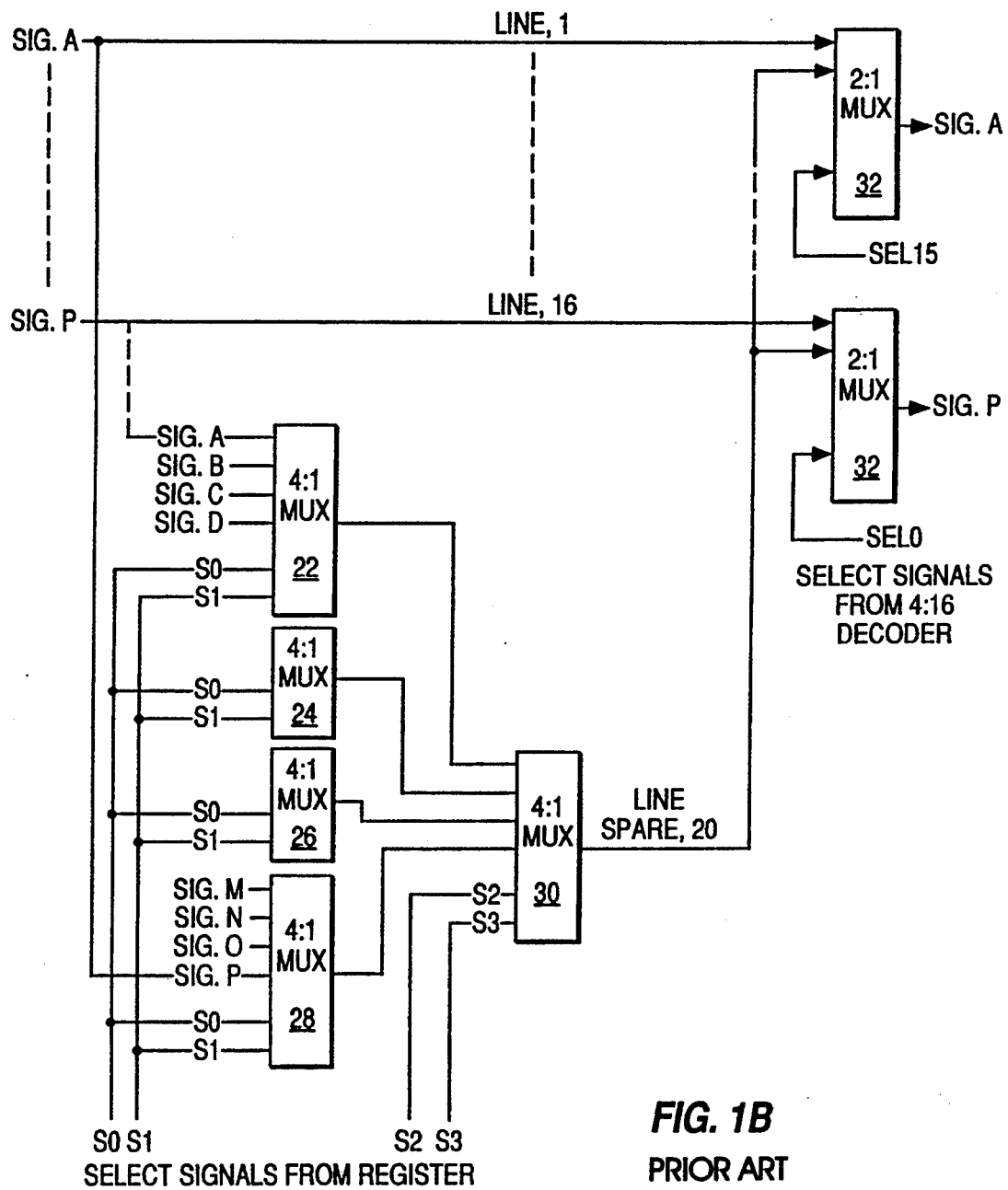
FIG. 1 is a block diagram of a prior art spare line switching structure.
Figure 1B:
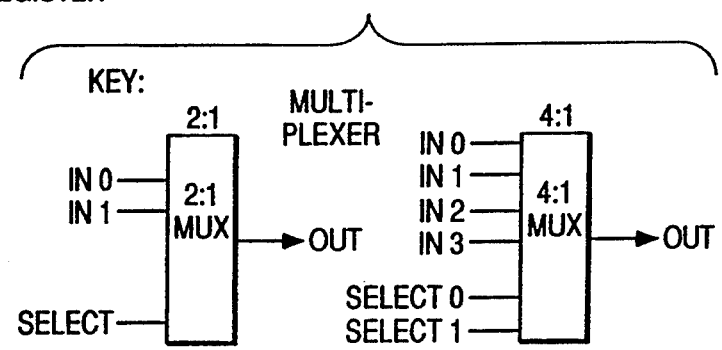
Figure 2A:
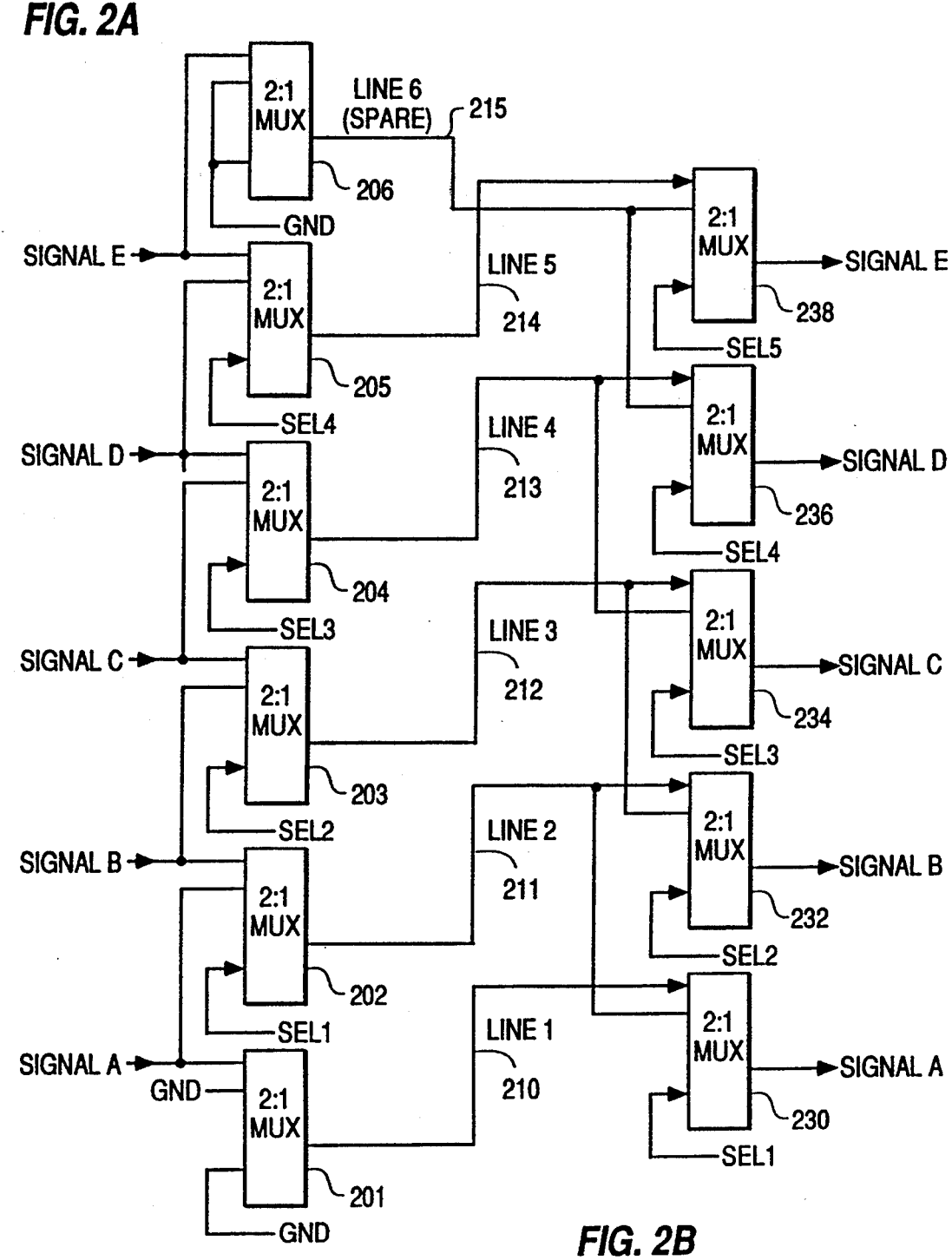
FIG. 2 is a block diagram of the bit switching implementation of this invention.
Figure 2B:
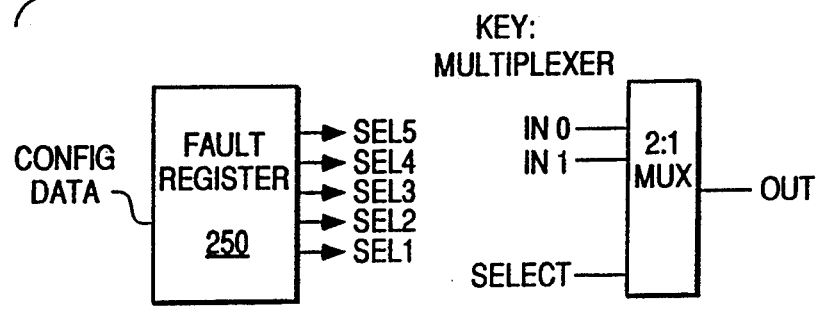

The spare signal line switching apparatus is illustrated in FIG. 2. On the transmit or input side, the multiplexer tree of the prior art (FIG. 1) is replaced by a 2:1 multiplexer at each of the input signals A–E. The multiplexers are designated 201–205. This structure provides reduced wiring congestion, and reduces signal delays. In a typical case where registers are required to provide boundary scan, the 2:1 multiplexer function can be integrated into the register with very little size or delay impact.

The same amount of circuitry is required on the receive or output side as in the prior art. 2:1 multiplexers 230, 232, 234, 236, and 238 correspond to signals A–E, respectively. The spare line 215, however, does not have to be made available to all the other lines, thereby reducing delays and wiring congestion. The total signal propagation delay remains fixed, regardless of whether the spare line is being used or is not used. Also, the propagation delay is not a function of the number of lines which are being spared by this single additional line.

The example in FIG. 2 is for five signals, A-E, which in normal operation are routed across lines 1-5 (210, 211, 212, 213, 214) respectively. Line 6 (215), the spare line, is normally not in use. If, in operation Line 3 (212) were to fail somewhere along the path shown, then by activating the selection line Sel 3 and 4 on multiplexers 204 and 205, the faulty line can be bypassed. Signals A and B still use their original signal lines, line 1 (210) and line 2 (211); signals C, D and E, are shifted to lines 4 (213), 5 (214) and 6 (215) respectively. At the same time, the multiplexers 234, 236 and 238 on the receive side are switched by the same logic select signals Sel 3 and Sel 4, with the addition of Sel 5, to permit the shifted signals to be interfaced to the correct output line. This scheme can be extended to include an arbitrary number of lines. The actual number is determined by the system configuration and the desired mean time between failures.

The box 250, labeled Fault Register, is an N-bit register, where N is the total number of active signal lines. The register bits are in 1 to 1 correspondence with the N (five in this example) signal lines. The register 250 is initially set to all zeros. If a failure is ever detected, then a 1 must be placed in all register positions equal to or greater than the number of the line that failed. FIG. 3 shows the contents of the Fault Register 250 that would be required if line 3 had failed as in the example above.

The Fault Register 250 can be loaded by the diagnostic system, or error correction logic, if present. FIG. 4 shows an implementation of the Fault Register 250 where the register contains the binary coded representation of the failed signal lines. The register contents are decoded by the decoder 400 and the decoded output signals are OR'ed together to generate the required select signals Sel 1-Sel 5. This circuit reduces the number of bits required in the Fault Register, but requires wide OR-gates 410 or equivalent OR-gate trees to support a large number of lines.

Figure 5:
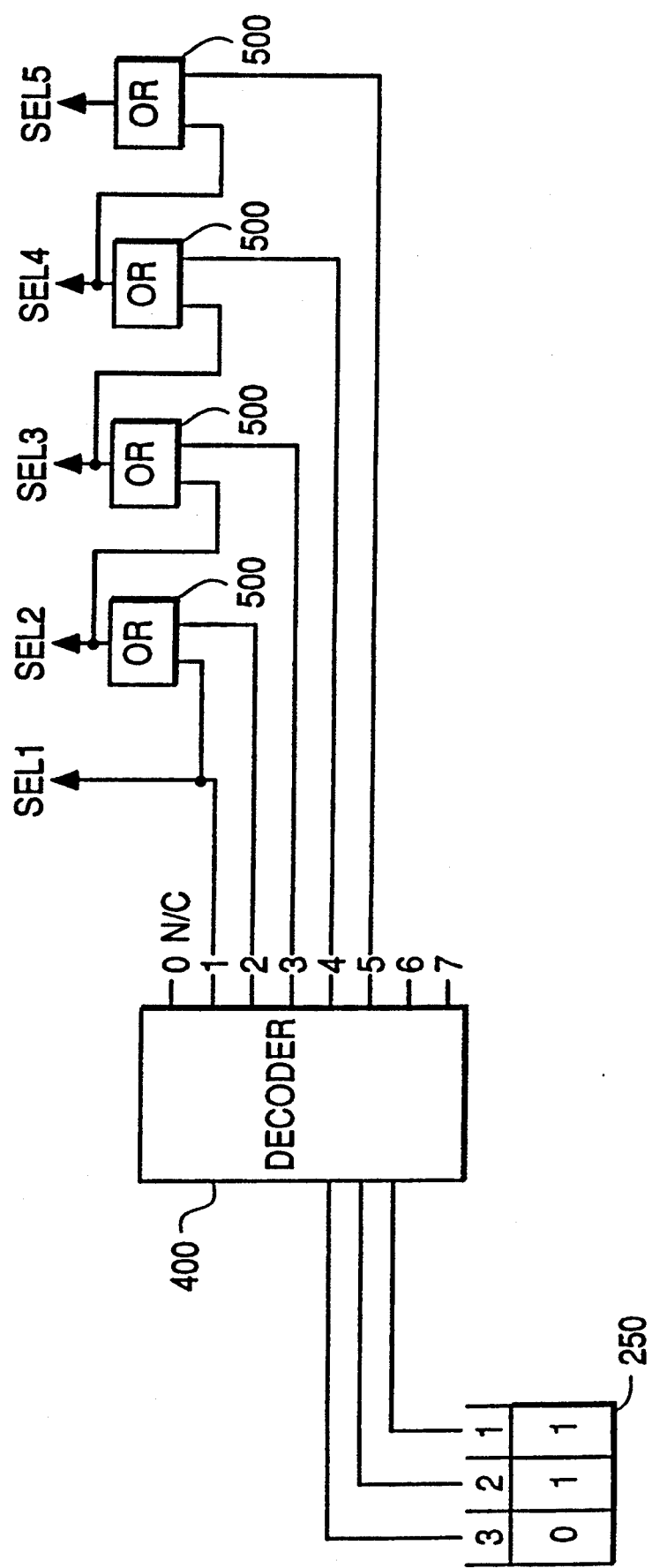
FIG. 5 is a block diagram of an alternate select generation logic.

FIG. 5 illustrates a decoding technique that requires only 2-input OR-gates 500. Since the Fault Register is changed only when reconfiguring the system around a failed line, the extra delay of the OR-gate is not in a critical data path and therefore does not impact the system performance.

While the invention has been described with reference to a preferred embodiment, it will be understood by those skilled in the art that various modifications can be made to the invention that departing from the spirit and scope of the invention. For example, while the signal lines 210-215 shown in FIG. 2 appear as single conductors, there could be one or more active or passive electrical components present. A failure by any one or more of these components would represent a failure of the entire signal line. Also, multiplexers are used in the preferred embodiment for shifting the lines, but in alternative embodiments other switching components as known in the art could be utilized. It should also be understood that the invention has application to equivalent implementations using fluidic circuits or electro-optical elements, as well as electrical apparatus. Accordingly, the invention shall be limited only as limited in the appended claims.

We claim:

1. In an apparatus having a plurality of signal carrying paths, including at least one spare path, apparatus for replacing a failed path with the spare path, comprising:

first and second sets of corresponding switching means spaced apart, the first set of switching means only including a spare switching means and a spare signal path, a plurality of n signal paths., where n is a series of successive integers 1 . . . n, the n signal paths connected as first inputs to the first set of switching means, each n input signal path further connected to a n+1 first switching means as a second input, the highest ordered signal path connected as an input to the spare switching means, each first switching means providing a single n output as a first input to a corresponding second switching means, said single n output being directly connected to the second switching means, each n output of the first switching means connected as a second input to each n−1 second switching means, the spare signal path connected as a second input to the second switching means connected to the highest ordered n signal path, each second switching means providing a sole n output signal path corresponding to the n input signal path of the first switching means, a single select signal connected as a third input to each first and second switching means, except the first switching means connected to the lowest ordered n signal and to a reference potential and the spare switching means connected to the highest ordered n signal and to a reference potential, and means responsive to error correction signals identifying a failed signal path between said first and second switching means, said means generating one or more select signals which shift each n input signal path to the next higher ordered signal path after the failed path and to the spare signal path to bypass the failed signal path while preserving the order of the n output signal paths to correspond to the order of the n input signal paths and maintaining the signal continuity on the n input and output signal paths.

2. The apparatus of claim 1 wherein the n output signal paths of the first switching means are directly connected to the input of the second switching means without intervening active circuit elements and the first and second switching means are communication devices.

3. The apparatus of claim 2 wherein the first and second switching means are 2:1 multiplexers.

4. The apparatus of claim 3 wherein the n input signal paths to the first switching means are shifted up to the n+1 ordered input signal paths of the first switching means while the n ordered output signal paths from the first switching means are shifted down to the n ordered output signal paths of the second switching means when a failed signal path occurs between the first and second switching means thereby maintaining the order and continuity of the n input and output signal paths.

5. A method for replacing a failed signal path with a spare line comprising the steps of:

providing n input signals to first switching means where n is an integer 1 . . . n, the highest ordered input signal being provided to a selected first switching means and to a spare switching means, providing n output signals from the first switching means directly over corresponding n signal paths as first inputs to corresponding second switching means and as second inputs to n−1 second switching means, detecting a failed signal path between the first and second switching means, generating one or more select signals in response to a detected failed signal path, supplying a single select signal to each first and second switching means having a higher order signal path than the failed signal path, except the lowest ordered first switching means and the spare switching means, enabling a spare signal path between the spare switching means and a selected second switching means to shift the n input signals to n+1 signal paths and to the spare signal path to bypass the failed signal path, supplying a single select signal to each second switching means to shift the n+1 input signals from the first switching means to the second switching means corresponding to the first switching means and providing a sole signal output for each second switching means whereby the failed signal path is bypassed and there is the same order and continuity in signal paths between the input to the first switching means and the output of the second switching means.

6. The method of claim 5 wherein the first and second switching means are communication devices in the form of 2:1 multiplexers.

7. The method of claim 6 wherein the shifted signals from the first multiplexers are directly supplied over passive signal paths to the second multiplexers.

* * * * *